US009777747B2

(12) United States Patent
Annati et al.

(10) Patent No.: US 9,777,747 B2
(45) Date of Patent: Oct. 3, 2017

(54) TURBOCHARGER WITH DUAL-USE MOUNTING HOLES

(71) Applicant: Caterpillar Inc., Peoria, IL (US)

(72) Inventors: Richard E. Annati, Lafayette, IN (US); Gary W. Powers, Lafayette, IN (US); Jeffrey W. McCormack, Fishers, IN (US); Thomas J. Williams, Milford, MI (US)

(73) Assignee: Caterpillar Inc., Peoria, IL (US)

( * ) Notice: Subject to any disclaimer, the term of this patent is extended or adjusted under 35 U.S.C. 154(b) by 393 days.

(21) Appl. No.: 14/642,621

(22) Filed: Mar. 9, 2015

(65) Prior Publication Data

US 2016/0265554 A1    Sep. 15, 2016

(51) Int. Cl.
| | |
|---|---|
| *F04D 29/62* | (2006.01) |
| *F04D 29/42* | (2006.01) |
| *F04D 29/059* | (2006.01) |
| *F02C 6/12* | (2006.01) |
| *F01D 25/28* | (2006.01) |

(52) U.S. Cl.
CPC .......... *F04D 29/624* (2013.01); *F01D 25/28* (2013.01); *F01D 25/285* (2013.01); *F02C 6/12* (2013.01); *F04D 29/059* (2013.01); *F04D 29/4206* (2013.01); *F05D 2220/40* (2013.01); *F05D 2230/68* (2013.01); *F05D 2250/281* (2013.01); *F05D 2260/31* (2013.01)

(58) Field of Classification Search
CPC .. F04D 29/624; F04D 29/059; F04D 29/4206; F01D 25/285; F01D 25/28; F02C 6/12; F05D 2260/31; F05D 2230/68; F05D 2250/281; F05D 2220/40
See application file for complete search history.

(56) References Cited

U.S. PATENT DOCUMENTS

| | | | | |
|---|---|---|---|---|
| 3,150,820 A | * | 9/1964 | Jekat | ..................... F01D 25/285 |
| | | | | 415/201 |
| 4,414,725 A | | 11/1983 | Breitweiser et al. | |
| 4,617,709 A | | 10/1986 | Gundlach | |

(Continued)

FOREIGN PATENT DOCUMENTS

| | | |
|---|---|---|
| DE | 10 2012 023 811 A1 | 6/2013 |
| DE | 20 2014 100 732 U1 | 4/2014 |

*Primary Examiner* — Gregory Anderson
*Assistant Examiner* — Eldon Brockman
(74) *Attorney, Agent, or Firm* — Finnegan, Henderson, Farabow, Garrett & Dunner LLP

(57) ABSTRACT

A housing for a turbocharger includes a first outer surface, a second outer surface opposite the first outer surface, and a mounting hole extending between the first outer surface and the second outer surface. The mounting hole includes a first end opposite a second end and a counterbore formed at the first end. The counterbore includes threads that are configured to engage with threads on a shank of a lifting device. The mounting hole also includes a throughbore extending from the counterbore to the second end and configured to receive a fastener for mounting the turbocharger housing. The counterbore forms a first opening through the first outer surface of the turbocharger housing, and the throughbore forms a second opening through the second outer surface of the turbocharger housing. The mounting hole is configured to receive only one fastener or shank at a time.

20 Claims, 5 Drawing Sheets

(56) References Cited

U.S. PATENT DOCUMENTS

| | | | |
|---|---|---|---|
| 4,716,735 A | 1/1988 | Ruf et al. | |
| 5,253,985 A | 10/1993 | Ruetz | |
| 5,299,909 A | 4/1994 | Wulf | |
| 5,465,482 A | 11/1995 | Elvekjaer et al. | |
| 5,526,640 A | 6/1996 | Brooks et al. | |
| 5,542,642 A * | 8/1996 | Rivard | F01D 25/28 248/676 |
| 5,598,803 A | 2/1997 | Czipri | |
| 5,964,574 A | 10/1999 | Meier et al. | |
| 6,045,266 A | 4/2000 | Mitsubori et al. | |
| 6,052,897 A | 4/2000 | Greber | |
| 6,120,246 A | 9/2000 | Auger et al. | |
| 6,168,375 B1 | 1/2001 | LaRue et al. | |
| 6,220,234 B1 | 4/2001 | Baker et al. | |
| 6,264,429 B1 | 7/2001 | Koeller et al. | |
| 6,368,077 B1 | 4/2002 | Meyerkord et al. | |
| 6,371,238 B1 | 4/2002 | Svihla | |
| 6,478,553 B1 | 11/2002 | Panos et al. | |
| 6,499,884 B1 | 12/2002 | Svihla et al. | |
| 6,540,480 B2 | 4/2003 | Nikpour | |
| 6,629,556 B2 | 10/2003 | Decker et al. | |
| 6,663,347 B2 | 12/2003 | Decker et al. | |
| 6,669,372 B1 | 12/2003 | Martin | |
| 6,709,232 B1 | 3/2004 | Vogiatzis | |
| 6,733,236 B2 | 5/2004 | Sumser et al. | |
| 6,742,989 B2 | 6/2004 | Osako et al. | |
| 6,754,954 B1 | 6/2004 | Decker | |
| 6,767,185 B2 | 7/2004 | Martin et al. | |
| 6,874,998 B2 | 4/2005 | Roby | |
| 6,877,901 B2 | 4/2005 | Wollenweber | |
| 6,904,949 B2 | 6/2005 | Decker et al. | |
| 6,928,816 B2 | 8/2005 | Leavesley | |
| 6,942,460 B2 | 9/2005 | Osako et al. | |
| 6,968,702 B2 | 11/2005 | Child et al. | |
| 6,979,172 B1 | 12/2005 | Mackenzie | |
| 6,979,183 B2 | 12/2005 | Baumann | |
| 6,994,526 B2 | 2/2006 | Furman et al. | |
| 7,001,143 B2 | 2/2006 | Vogiatzis | |
| 7,001,155 B2 | 2/2006 | Cabrales et al. | |
| 7,008,182 B2 | 3/2006 | Kopp et al. | |
| 7,010,915 B2 | 3/2006 | Stilgenbauer | |
| 7,040,867 B2 | 5/2006 | Louthan et al. | |
| 7,043,915 B2 * | 5/2006 | Anello | F01D 25/28 248/637 |
| 7,052,241 B2 | 5/2006 | Decker | |
| 7,063,508 B2 | 6/2006 | Higashimori et al. | |
| 7,066,919 B1 | 6/2006 | Sauerland et al. | |
| 7,086,842 B2 | 8/2006 | Wild | |
| 7,097,411 B2 | 8/2006 | Smoke et al. | |
| 7,104,693 B2 | 9/2006 | Mavrosakis | |
| 7,118,335 B2 | 10/2006 | Vacarezza et al. | |
| 7,147,433 B2 | 12/2006 | Ghizawi | |
| 7,191,519 B2 | 3/2007 | Roby | |
| 7,204,671 B2 | 4/2007 | Dellmann | |
| 7,214,037 B2 | 5/2007 | Mavrosakis | |
| 7,232,258 B2 | 6/2007 | Garcia | |
| 7,241,416 B2 | 7/2007 | Sweetland | |
| 7,329,048 B2 | 2/2008 | Klusman et al. | |
| 7,344,362 B2 | 3/2008 | Kopp et al. | |
| 7,384,236 B2 | 6/2008 | Meier et al. | |
| 7,401,980 B2 | 7/2008 | Krauss et al. | |
| 7,419,304 B2 | 9/2008 | Mavrosakis | |
| 7,461,507 B2 | 12/2008 | Arnold et al. | |
| 7,461,979 B2 | 12/2008 | Mavrosakis | |
| 7,478,532 B2 | 1/2009 | Martin et al. | |
| 7,484,932 B2 | 2/2009 | Aguilar | |
| 7,517,154 B2 | 4/2009 | McKeirnan, Jr. | |
| 7,568,883 B2 | 8/2009 | Arnold et al. | |
| 7,600,969 B2 | 10/2009 | Frankenstein et al. | |
| 7,631,497 B2 | 12/2009 | Panek | |
| 7,677,041 B2 | 3/2010 | Woollenweber | |
| 7,686,586 B2 | 3/2010 | Nikpour | |
| 7,722,336 B2 | 5/2010 | Vaccarezza et al. | |
| 7,766,550 B2 | 8/2010 | Larue | |
| 7,771,162 B2 | 8/2010 | Castan | |
| 7,771,170 B2 | 8/2010 | Seiler | |
| 7,793,494 B2 | 9/2010 | Wirth et al. | |
| 7,797,936 B2 | 9/2010 | Hayashi et al. | |
| 7,798,770 B2 | 9/2010 | Sumser et al. | |
| 7,837,448 B2 | 11/2010 | Shimizu et al. | |
| 7,845,900 B2 | 12/2010 | Roduner et al. | |
| 7,874,136 B2 | 1/2011 | Heyerman | |
| 7,878,758 B2 | 2/2011 | Allen et al. | |
| 7,918,215 B2 | 4/2011 | Martin et al. | |
| 7,946,809 B2 | 5/2011 | Meier et al. | |
| 7,987,599 B2 | 8/2011 | Mavrosakis | |
| 8,011,885 B2 | 9/2011 | Purdey | |
| 8,016,554 B2 | 9/2011 | Ward | |
| 8,118,570 B2 | 2/2012 | Meacham et al. | |
| 8,157,516 B2 | 4/2012 | Chen et al. | |
| 8,157,543 B2 | 4/2012 | Shimizu | |
| 8,162,602 B2 | 4/2012 | Caucheteux et al. | |
| 8,162,604 B2 | 4/2012 | Kühnel et al. | |
| 8,166,746 B2 | 5/2012 | Heyerman | |
| 8,181,632 B2 | 5/2012 | Ueno et al. | |
| 8,186,886 B2 | 5/2012 | McKeirnan, Jr. | |
| 8,226,296 B2 | 7/2012 | Larue | |
| 8,234,867 B2 | 8/2012 | Palazzolo et al. | |
| 8,240,921 B2 | 8/2012 | Böning et al. | |
| 8,241,006 B2 | 8/2012 | Renett | |
| 8,328,509 B2 | 12/2012 | Gee et al. | |
| 8,328,535 B2 | 12/2012 | Anschel et al. | |
| 8,339,122 B2 | 12/2012 | Cox et al. | |
| 8,348,595 B2 | 1/2013 | Koch et al. | |
| 8,353,666 B2 | 1/2013 | Masson et al. | |
| 8,360,730 B2 | 1/2013 | Chen et al. | |
| 8,372,335 B2 | 2/2013 | Claude et al. | |
| 8,376,721 B2 | 2/2013 | Thayer et al. | |
| 8,398,363 B2 | 3/2013 | Mundinger et al. | |
| 8,419,350 B2 | 4/2013 | Just | |
| 8,449,190 B2 | 5/2013 | Larue | |
| 8,454,242 B2 | 6/2013 | Mavrosakis | |
| 8,464,528 B2 | 6/2013 | Sausse et al. | |
| 8,464,777 B2 | 6/2013 | Zhu et al. | |
| 8,465,261 B2 | 6/2013 | Holzschuh | |
| 8,496,452 B2 | 7/2013 | Marsal et al. | |
| 8,517,665 B2 | 8/2013 | Lugo et al. | |
| 8,517,679 B2 | 8/2013 | Schlienger et al. | |
| 8,545,172 B2 | 10/2013 | Severin et al. | |
| 8,568,092 B2 | 10/2013 | Matsuyama | |
| 8,572,963 B2 | 11/2013 | Cuniberti et al. | |
| 8,602,655 B2 | 12/2013 | Tabata | |
| 8,621,863 B2 | 1/2014 | Krätschmer et al. | |
| 8,622,691 B2 | 1/2014 | Eguchi et al. | |
| 8,628,247 B2 | 1/2014 | Uesugi | |
| 8,636,413 B2 | 1/2014 | Fiedler et al. | |
| 8,641,380 B2 | 2/2014 | McKenzie | |
| 8,641,382 B2 | 2/2014 | Weber et al. | |
| 8,668,432 B2 | 3/2014 | Sebald et al. | |
| 8,696,316 B2 | 4/2014 | Decker et al. | |
| 8,702,394 B2 | 4/2014 | Decker et al. | |
| 8,727,716 B2 | 5/2014 | Clements et al. | |
| 8,734,130 B2 | 5/2014 | Meacham et al. | |
| 8,736,393 B2 | 5/2014 | Herault et al. | |
| 8,740,465 B2 | 6/2014 | McKeirnan, Jr. | |
| 8,763,393 B2 | 7/2014 | Severin et al. | |
| 8,764,296 B2 | 7/2014 | Omori | |
| 8,764,376 B2 | 7/2014 | Lei et al. | |
| 8,764,388 B2 | 7/2014 | Roberts et al. | |
| 8,790,066 B2 | 7/2014 | Gutknecht | |
| 8,790,574 B2 | 7/2014 | Toda et al. | |
| 8,794,905 B2 | 8/2014 | Matsuyama | |
| 8,807,840 B2 | 8/2014 | House et al. | |
| 8,814,538 B2 | 8/2014 | House et al. | |
| 8,834,111 B2 | 9/2014 | Holzschuh | |
| 8,845,271 B2 | 9/2014 | Woollenweber et al. | |
| 8,961,128 B2 | 2/2015 | Mavrosakis et al. | |
| 9,010,108 B2 * | 4/2015 | Williams | F01D 25/16 415/206 |
| 2001/0046439 A1 * | 11/2001 | Mariotti | F04D 17/125 415/203 |
| 2003/0106982 A1 * | 6/2003 | Battig | F01D 25/243 248/678 |

(56) References Cited

U.S. PATENT DOCUMENTS

| | | | |
|---|---|---|---|
| 2005/0257521 A1* | 11/2005 | Anello | F01D 25/28 60/602 |
| 2009/0095875 A1 | 4/2009 | Anello | |
| 2012/0257966 A1* | 10/2012 | Boening | F01D 25/162 415/229 |
| 2013/0004291 A1* | 1/2013 | Williams | F01D 25/16 415/1 |
| 2013/0309072 A1 | 11/2013 | Marsal et al. | |
| 2014/0358363 A1 | 12/2014 | Mavrosakis et al. | |
| 2015/0000272 A1 | 1/2015 | Balsley, II | |

* cited by examiner

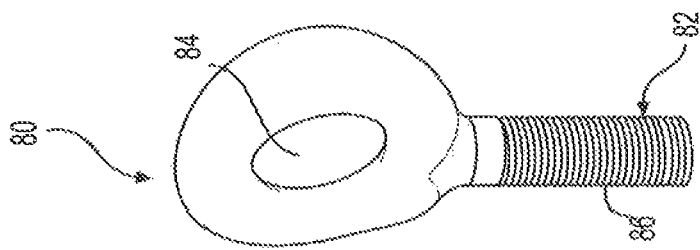
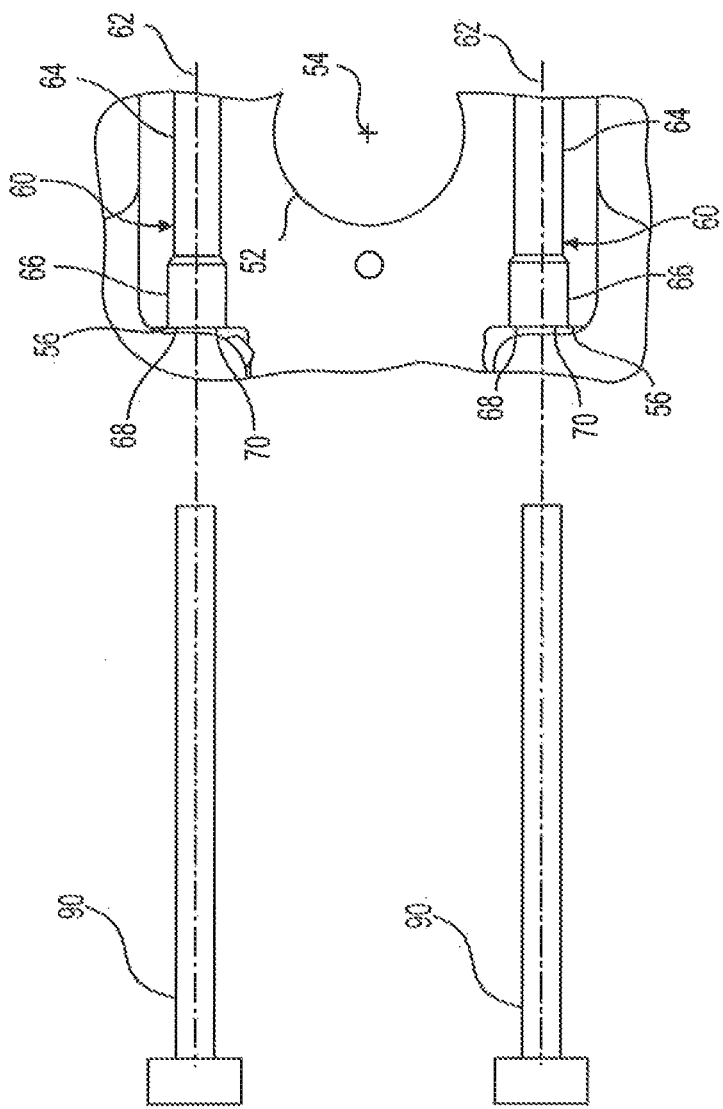
FIG. 5
FIG. 4

TURBOCHARGER WITH DUAL-USE MOUNTING HOLES

TECHNICAL FIELD

The present disclosure relates generally to a turbocharger, and more particularly, to a turbocharger with dual-use mounting holes.

BACKGROUND

Internal combustion engines, for example, diesel engines, gasoline engines, or natural gas engines employ turbochargers to deliver compressed air for combustion in the engine. A turbocharger compresses air flowing into the engine, helping to force more air into the combustion chambers of the engine. The increased supply of air allows increased fuel combustion in the combustion chambers of the engine, resulting in increased power output from the engine.

Because the turbocharger compresses air flowing into the engine, the turbocharger is typically mounted at a location on or near the engine. The turbocharger may include one or more mounting holes for receiving mounting bolts that mount the turbocharger at the mounting location.

One attempt to include mounting holes on the turbocharger is disclosed in U.S. Pat. No. 4,716,735 issued to Ruf et al. on Jan. 5, 1988 ("the '735 patent"). In particular, the '735 patent discloses a turbocharger including a turbine casing and a compressor housing that are each attached to a bearing housing. The bearing housing includes a flange, and a fastener attaches the flange of the bearing housing to a part that is fastened to the chassis of a motor vehicle.

Although the turbocharger disclosed in the '735 patent attempts to allow the turbocharger to be attached to the motor vehicle, the disclosed turbocharger may still be less than optimal. For example, the '735 patent does not disclose a device that allows the turbocharger to be lifted. Thus, personnel may attempt to attach a lifting device to the turbocharger, e.g., by forcefully engage the lifting device into the flange of the bearing housing, which may damage the flange during engagement and subsequent removal of the lifting device. Alternatively, personnel may attempt to attach a lifting device, such as straps, around the turbocharger, which may create an unsafe environment due to the risk that the straps may slip off the turbocharger.

The turbocharger of the present disclosure solves one or more of the problems set forth above and/or other problems of the prior art.

SUMMARY

In one aspect, the present disclosure is directed to a housing for a turbocharger. The turbocharger housing includes a first outer surface, a second outer surface opposite the first outer surface, and at least one mounting hole extending between the first outer surface and the second outer surface. The mounting hole includes a first end opposite a second end and a counterbore formed at the first end. The counterbore includes threads that are configured to engage with threads on a shank of a lifting device. The mounting hole also includes a throughbore extending from the counterbore to the second end and configured to receive a fastener for mounting the turbocharger housing. The counterbore forms a first opening through the first outer surface of the turbocharger housing, and the throughbore forms a second opening through the second outer surface of the turbocharger housing. The mounting hole is configured to receive only one fastener or shank at a time.

In another aspect, the present disclosure is directed to a turbocharger. The turbocharger includes a compressor housing including a compressor wheel, a turbine housing including a turbine wheel, and a shaft attached at a first end to the compressor wheel and attached at a second end to the turbine wheel. The turbocharger also includes a bearing housing connecting the compressor housing to the turbine housing, and the bearing housing includes bearings for supporting the shaft. The bearing housing includes a first outer surface, a second outer surface opposite the first outer surface, and a mounting hole extending between the first outer surface and the second outer surface. The mounting hole includes a first end opposite a second end and a counterbore formed at the first end of the mounting hole. The counterbore includes threads that are configured to engage with threads on a shank of a lifting device. The mounting hole also includes a throughbore extending from the counterbore to the second end of the mounting hole and configured to receive a fastener for mounting the bearing housing. The counterbore forms a first opening through the first outer surface of the bearing housing, and the throughbore forms a second opening through the second outer surface of the bearing housing. The mounting hole is configured to receive only one fastener or shank at a time.

In another aspect, the present disclosure is directed to a method of mounting a turbocharger to a machine. The method includes detaching a lifting device from a housing of the turbocharger by removing a shank of the lifting device from a counterbore in a mounting hole in the turbocharger housing. The mounting hole extends between a first outer surface and a second outer surface of the turbocharger housing, and the second outer surface is opposite the first outer surface. The method also includes, after removing the shank, inserting a fastener through a throughbore in the mounting hole and attaching the fastener to the machine. The mounting hole has a first end and a second end. The counterbore is formed at the first end and forms a first opening through the first outer surface of the turbocharger housing. The throughbore is formed at the second end and forms a second opening through the second outer surface of the turbocharger housing.

BRIEF DESCRIPTION OF THE DRAWINGS

FIG. 4 is a cross-sectional view of a portion of the bearing assembly taken along the line A-A of FIG. 3;

FIG. 5 is a perspective view of a lifting eye device for attaching to the turbocharger of FIG. 1, according to an exemplary embodiment.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
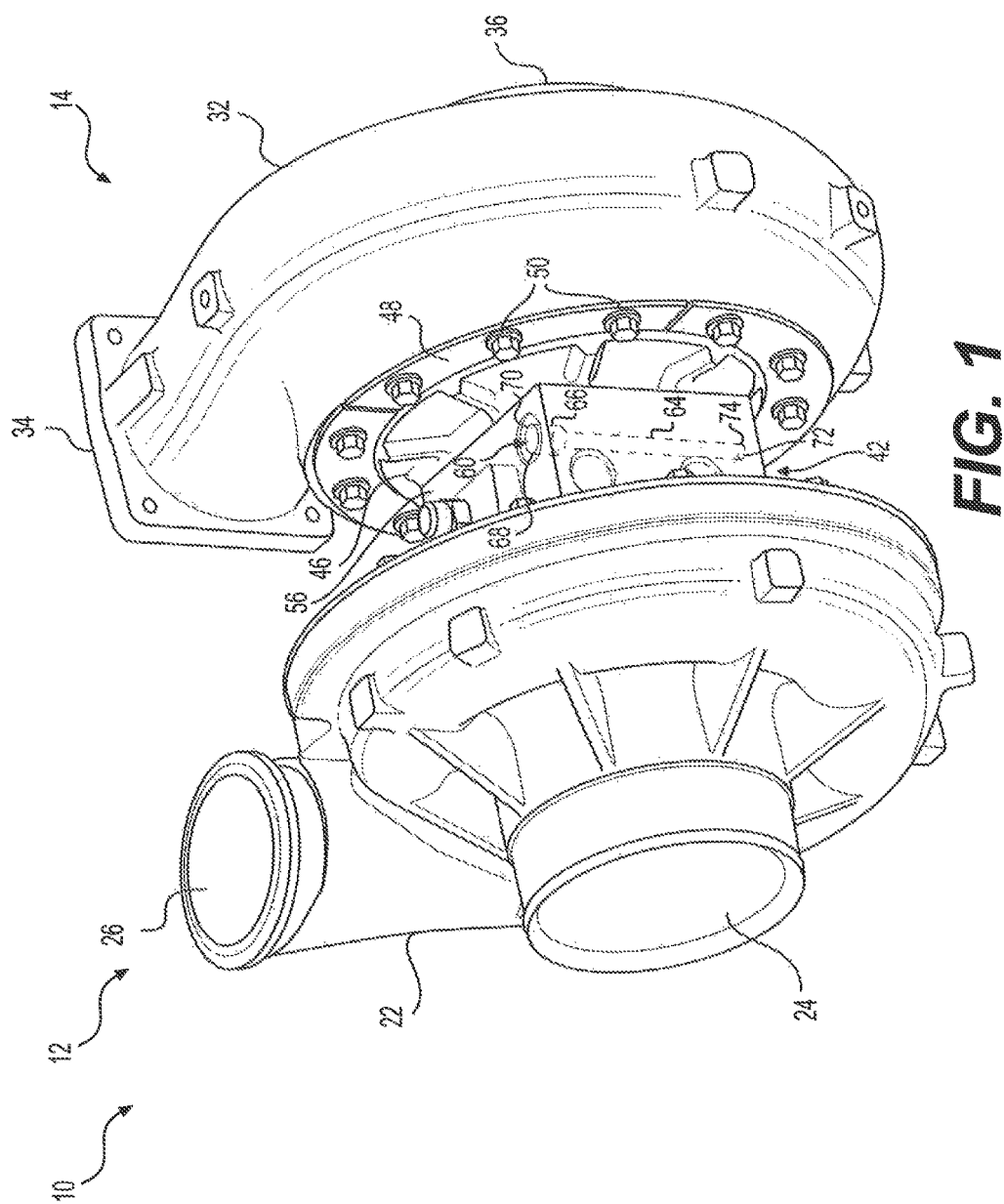
FIG. 1 is a perspective view of a turbocharger, according to an exemplary embodiment.
Figure 2:
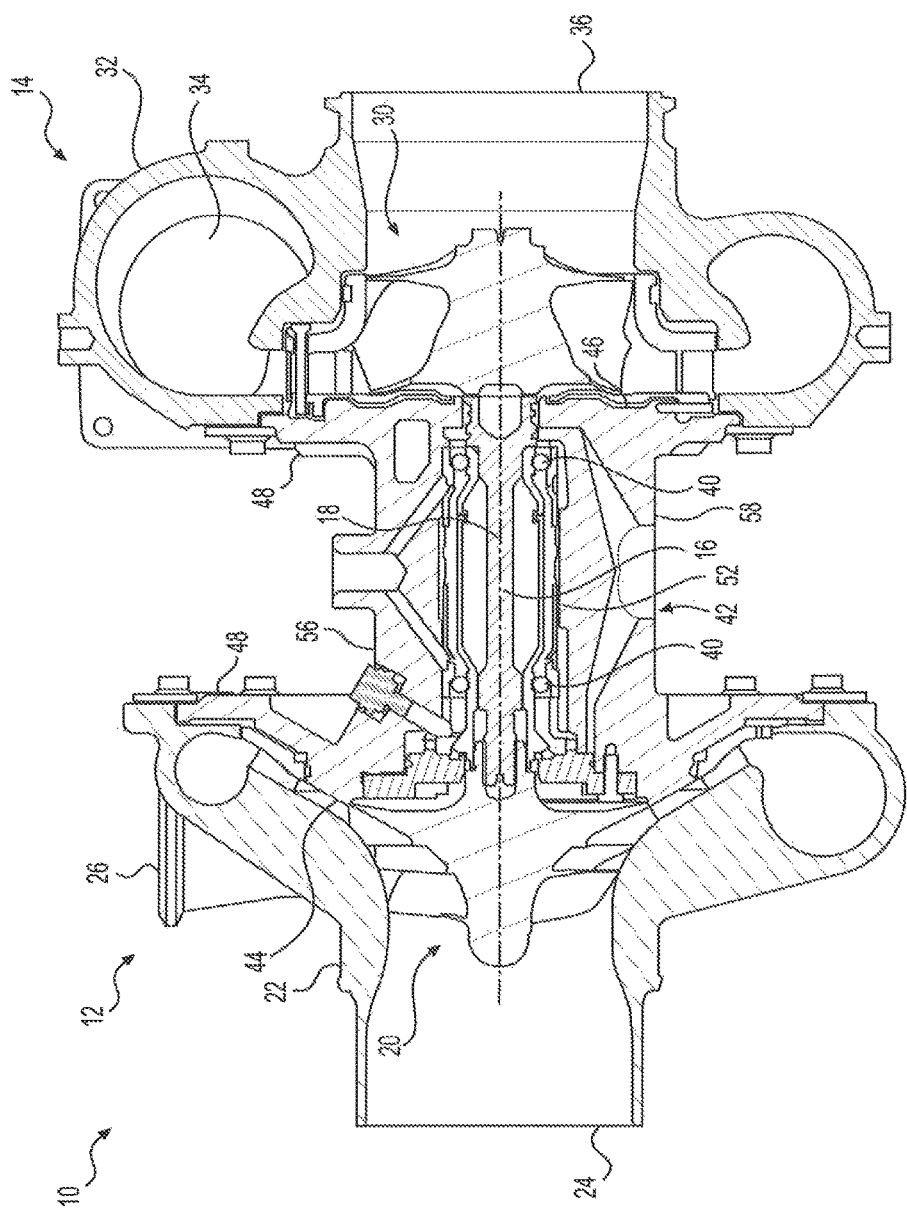
FIG. 2 is a cross-sectional view of the turbocharger of FIG. 1.

FIGS. 1 and 2 illustrate an exemplary embodiment of a turbocharger 10. The turbocharger 10 may be used with an engine (not shown) of a machine that performs some type of operation associated with an industry such as railroad, marine, power generation, mining, construction, farming, or another industry known in the art. As shown in FIGS. 1 and 2, the turbocharger 10 may include a compressor stage 12 and a turbine stage 14 connected by a shaft 16 (FIG. 2).

As shown in FIG. 2, the compressor stage 12 may embody a fixed geometry compressor impeller or wheel 20 disposed in a compressor housing 22. The compressor wheel 20 and the compressor housing 22 may be disposed around a rotational axis 18 of the shaft 16. The compressor wheel 20 may be attached to the shaft 16 and configured to compress air received at an ambient pressure level before the air enters the engine for combustion. Air may enter the compressor housing 22 via a compressor inlet 24 and exit the compressor housing 22 via a compressor outlet 26. As air moves through the compressor stage 12, the compressor wheel 20 may force compressed air into the engine.

The turbine stage 14 may include a turbine wheel 30, which may be attached to the shaft 16 and may be disposed in a turbine housing 32. The shaft 16 may extend from the compressor housing 22 to the turbine housing 32. The turbine wheel 30 and the turbine housing 32 may be disposed around the rotational axis 18 of the shaft 16. Exhaust gases exiting the engine may enter the turbine housing 32 via a turbine inlet 34 and exit the turbine housing 32 via a turbine outlet 36. As the hot exhaust gases move through the turbine housing 32 and expand against blades of the turbine wheel 30, the turbine wheel 30 may rotate the compressor wheel 20 via the shaft 16.

Bearings 40 may support the shaft 16. Although FIG. 1 illustrates only two bearings 40, it is contemplated that the turbocharger 10 may include any number of bearings 40. The bearings 40 may be disposed in a bearing housing 42. The compressor housing 22, the turbine housing 32, and the bearing housing 42 may form a housing of the turbocharger 10.

Figure 3:
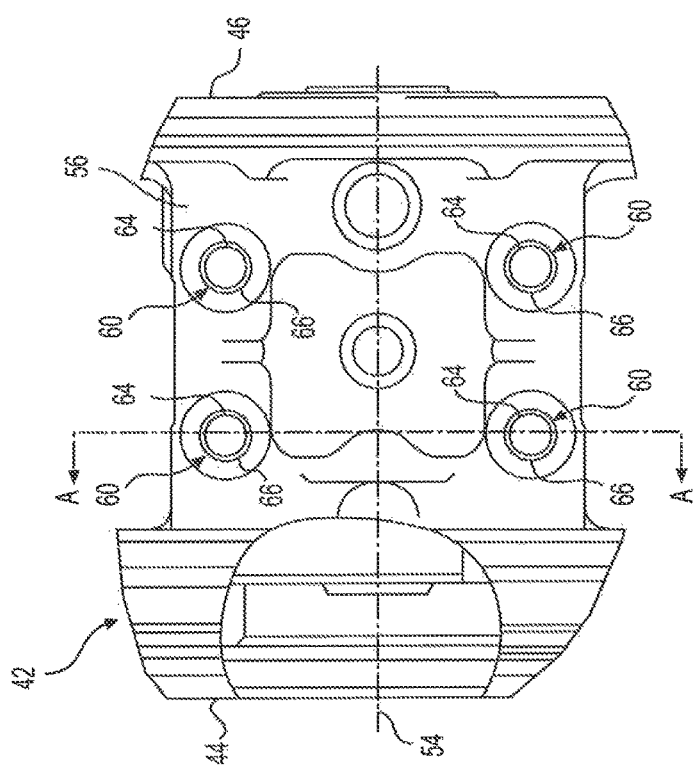
FIG. 3 is a top view of a portion of a bearing assembly of the turbocharger of FIG. 1.

FIG. 3 illustrates a portion of the bearing housing 42, according to an exemplary embodiment. As shown in FIGS. 2 and 3, the bearing housing 42 may include a first end 44 and a second end 46 opposite the first end 44. The first end 44 may be attached to the compressor housing 22, and the second end 46 may be attached to the turbine housing 32. For example, each of the first end 44 and the second end 46 may form a flange 48 that includes one or more mounting bores that may receive one or more fasteners 50. The flange 48 of the first end 44 may be configured to be fastened to the compressor housing 22 using the fasteners 50, and the flange 48 on the second end 46 may be configured to be fastened to the turbine housing 32 using the fasteners 50. The flanges 48 are shown in FIG. 2 and omitted from the portion of the bearing housing 42 shown in FIG. 3. FIG. 1 shows the flange 48 on the second end 46. The flanges 48 may extend radially around a periphery of the respective first end 44 and second end 46. In an embodiment, each flange 48 may include twelve mounting bores for receiving twelve fasteners 50, but it is understood that each flange 48 may include any number of mounting bores for receiving a corresponding number of fasteners 50.

FIG. 4 illustrates a cross-section of the bearing housing 42, according to an exemplary embodiment. As shown in FIGS. 2 and 4, the bearing housing 42 may include a channel 52 configured to receive the shaft 16. The channel 52 may extend through the first end 44 and the second end 46 of the bearing housing 42, and the shaft 16 may extend through the channel 52 to connect to the compressor wheel 20 and the turbine wheel 30 at opposite ends of the shaft 16. The channel 52 may extend generally along an axis 54 that may be generally parallel to and/or collinear with the rotational axis 18 of the shaft 16.

As shown in FIG. 2, the bearing housing 42 may include a first outer surface 56 and a second outer surface 58 that each extend between the first end 44 and the second end 46. The first outer surface 56 and the second outer surface 58 may be located on opposite surfaces of the bearing housing 42. For example, the first outer surface 56 may be a top surface of the bearing housing 42, and the second outer surface 58 may be a bottom surface of the bearing housing 42, or vice versa.

The housing of the turbocharger 10 may include one or more mounting holes 60. In the embodiment of the turbocharger 10 shown in FIGS. 1-4, the bearing housing 42 includes a plurality of the mounting holes 60, e.g., four mounting holes 60, but it is understood that the turbocharger 10 may include more or fewer than four mounting holes 60. When there are four mounting holes 60, the mounting holes 60 may be disposed around the shaft 16 and/or the channel 52 such that at least a first pair of the mounting holes 60 extends on one side of the shaft 16 and/or the channel 52 and at least a second pair of the mounting holes 60 extends on the opposite side of the shaft 16 and/or the channel 52, as shown in FIG. 3.

The mounting holes 60 may extend between the first outer surface 56 and the second outer surface 58. Alternatively, the mounting holes 60 may be formed in other portions of the housing of the turbocharger 10, e.g., extending between first and second outer surfaces of the compressor housing 22, the turbine housing 32, etc. Each mounting hole 60 may extend along an axis 62, as shown in FIG. 4. The axes 62 of the mounting holes 60 may be generally parallel. Each axis 62 may be generally perpendicular to the axis 54 of the channel 52 and/or the rotational axis 18 of the shaft 16. Each axis 62 may also be generally perpendicular to the first outer surface 56 and/or the second outer surface 58.

Each mounting hole 60 may include a throughbore 64 and a counterbore 66. As shown in FIGS. 1 and 3, the counterbore 66 may be formed at a first end 68 of the mounting hole 60 such that the counterbore 66 forms a first opening 70 through the first outer surface 56 of the bearing housing 42. In an embodiment, the counterbore 66 may extend to about 30 mm or less (e.g., between about 20 mm and about 30 mm) along the axis 62 from the first outer surface 56. The counterbore 66 may have a constant outer dimension (e.g., outer diameter) along the axis 62. Also, the counterbore 66 may include threads (not shown), e.g., female threads, that extend along the length of the counterbore 66. In an embodiment, the counterbore 66 may have a tap size of M16 with a thread pitch of about 2 mm (e.g., having a major diameter of about 16 mm and a minor diameter of about 14 mm).

As shown in FIG. 1, the throughbore 64 may extend from the counterbore 66 to a second end 72 of the mounting hole 60 such that the throughbore 64 forms a second opening 74 through the second outer surface 58 of the bearing housing 42. The throughbore 64 may have a constant dimension (e.g., diameter) along the axis 62 such that the threads of the counterbore 66 have a minor diameter that is larger than the diameter of the throughbore 64. In an embodiment, the counterbore 66 may have a minor diameter of about 14 mm, and the throughbore 64 may have a diameter of about 9 mm to 10 mm.

FIG. 5 illustrates an exemplary embodiment of a lifting device 80 that may attach to each mounting hole 60. The lifting device 80 may include a lifting eye including a shank 82 formed on one end and a portion forming an aperture 84 on the opposite end. Alternatively, the lifting device 80 may include a hook or other device that allows the turbocharger 10 to be lifted and that is connected to the shank 82. The shank 82 of each lifting device 80 may screw into one of the mounting holes 60. In an embodiment, each shank 82 may include threads 86 that are configured to engage with the threads of the respective counterbore 66 to fasten the lifting device 80 to the turbocharger 10. A plurality of the lifting devices 80 may be attached to the bearing housing 42 to allow the bearing housing 42 and/or the turbocharger 10 to be lifted and moved, in the embodiment show in FIGS. 1-4, up to four lifting devices 80 may be attached to the bearing housing 42. In the exemplary embodiment, the maximum number of lifting devices 80 that may be attached to the bearing housing 42 may correspond to the number of the mounting holes 60, and it is understood that the maximum number of lifting devices 80 may be fewer or greater than four, depending on the number of mounting holes 60 in the bearing housing 42.

As shown in FIG. 4, each throughbore 64 may be configured to receive a fastener 90, such as a mounting bolt or other mounting mechanism, for mounting the bearing housing 42 to the machine configured to operate with the turbocharger 10. Each mounting hole 60 may be configured to receive only one of the fastener 90 or the shank 82 of the lifting device 80 at a time. Therefore, the lifting devices 80 are removed from the mounting holes 60) prior to inserting the fasteners 90. The fasteners 90 may pass through the respective throughbores 64, and may screw or fasten into holes in the machine.

INDUSTRIAL APPLICABILITY

The disclosed turbocharger housing and method of mounting the turbocharger finds potential application in relation to any turbocharger. The disclosed turbocharger housing and method of mounting the turbocharger finds particular applicability in relation to a turbocharger associated with an internal combustion engine. One skilled in the art will recognize, however, that the disclosed turbocharger housing and method of mounting the turbocharger could be utilized in relation to other systems that may or may not be associated with a turbocharger associated with an internal combustion engine.

Figure 6:
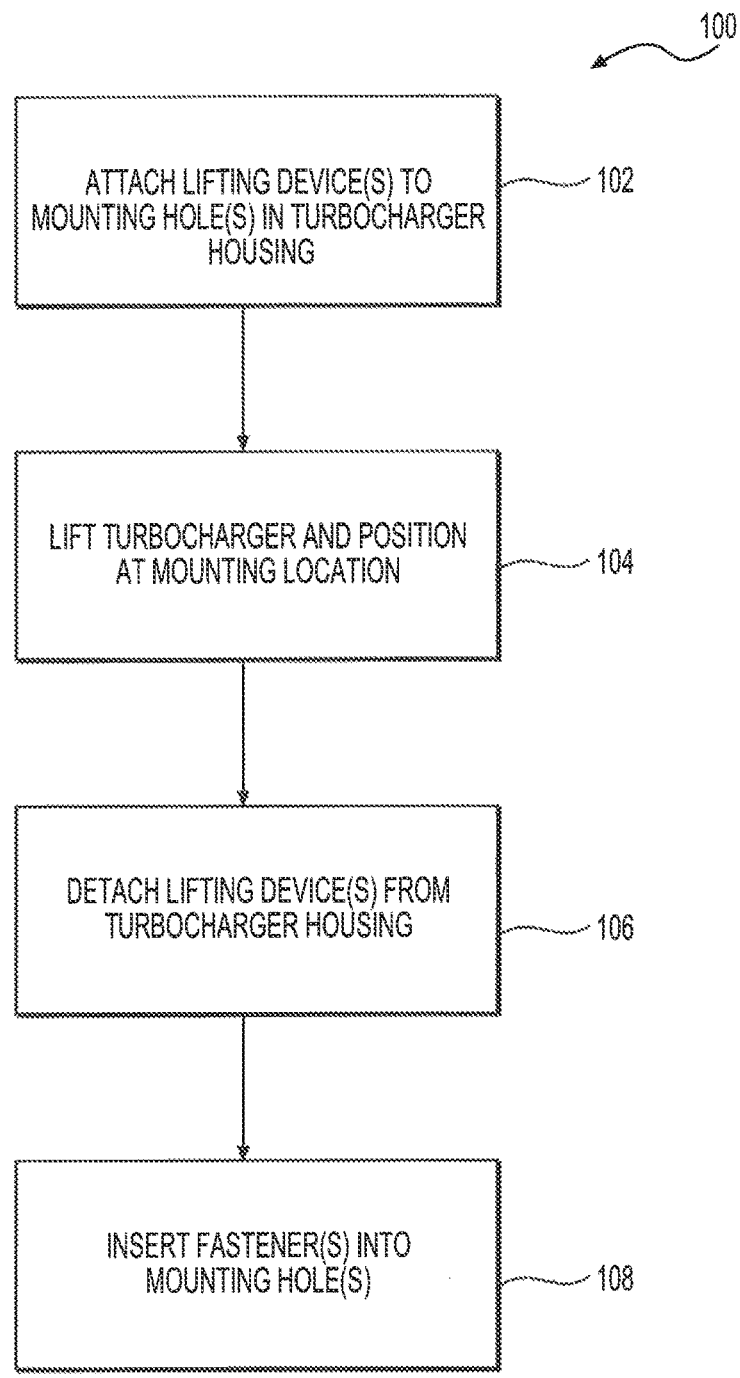
FIG. 6 is a flow chart illustrating a method of mounting a turbocharger to a machine, according to an exemplary embodiment.

FIG. 6 is a flow chart illustrating a method 100 of mounting the turbocharger 10 to a machine, according to an exemplary embodiment. During or after manufacturing and/or assembling the turbocharger 10, the lifting devices 80 may be attached to the mounting holes 60 in the housing of the turbocharger 10 (step 102). In the exemplary embodiment, the threads 86 on the shanks 82 of the lifting devices 80 may engage with the threads of the counterbores 66 of the respective mounting holes 60 in the bearing housing 42 to attach the lifting devices 80 to the turbocharger 10.

After attaching the lifting device(s) 80 to the turbocharger 10, the turbocharger 10 may be lifted and positioned at a mounting location on the machine (step 104). In an embodiment, the turbocharger 10 may be manufactured and/or assembled in a location that is different from the mounting location where the turbocharger 10 is mounted to the machine. For example, the turbocharger 10 may be mounted on or near the engine, e.g., on a crankcase or cylinder block of the engine, on a chassis of the machine, in the engine compartment of the machine, etc. The lifting devices 80 may be used to lift the turbocharger 10 so that the turbocharger 10 may be transported between locations. The lifting devices 80 may also be used to lift and move the housing of the turbocharger 10, e.g., the bearing housing 42, during the manufacture and/or assembly of the turbocharger 10.

When the turbocharger 10 is in the mounting location (e.g., after lifting and moving the housing of the turbocharger 10 using the lifting devices 80), the lifting devices 80 may be detached from the housing of the turbocharger 10 (step 106). The lifting devices 80 may be detached by removing the shanks 82 of the lifting devices 80 from the respective counterbores 66 of the mounting holes 60 in the bearing housing 42. The shanks 82 may be removed from the respective counterbores 66 by disengaging the threads 86 on the shanks 82 from the threads on the counterbores 66.

After the lifting devices 80 are detached from the housing of the turbocharger 10, the fasteners 90 may be inserted into the mounting holes 60 to attach the turbocharger 10 to the machine (step 108). The fasteners 90 may be inserted until the fasteners 90 extend through both the first outer surface 56 and the second outer surface 58 of the bearing housing 42.

In an embodiment, all of the lifting devices 80 may be detached from the housing of the turbocharger 10 in step 106 before inserting any of the fasteners 90 into the mounting holes 60 in step 108. Alternatively, in step 106, one or more of the lifting devices 80 (e.g., at least a first pair of the lifting devices 80) may be detached while keeping one or more other lifting devices 80 (e.g., at least a second pair of the lifting devices 80) attached to the housing of the turbocharger 10. Then, one or more of the fasteners 90 (e.g., at least a first pair of the fasteners 90) may be inserted into the open mounting holes 60 (that are not attached to lifting devices 80) to attach the turbocharger 10 to the machine in step 108. Because one or more of the lifting devices 80 may still be attached to the turbocharger 10, the lifting devices 80 may be used to move the turbocharger 10 to allow personnel to line up the mounting holes 60 with corresponding holes in the machine to attach the fasteners 90 (e.g., at least the first pair of the fasteners 90). After the fasteners 90 are attached to the corresponding holes in the machine, the remaining lifting devices 80 (e.g., at least the second pair of the lifting devices 80) may be detached from the housing of the turbocharger 10, and then one or more other fasteners 90 (e.g., at least a second pair of the fasteners 90) may be inserted into the remaining open mounting holes 60 to attach to the machine.

The flow chart described above in connection with FIG. 6 depicts an exemplary embodiment of the method of mounting the turbocharger 10 to the machine. Those skilled in the art will recognize that similar methods may be used without deviating from the scope of the present disclosure.

Several advantages over the prior art may be associated with the turbocharger housing and method of mounting the turbocharger described above. Providing lifting devices 80 for the turbocharger 10 may allow the turbocharger 10 to be lifted and moved between locations, such as, for example, the manufacturing and/or assembly location(s) and the mounting location. Some turbochargers may be relatively heavy and difficult to maneuver, and therefore providing the lifting devices 80 may allow transportation of the turbochargers 10 more quickly and safely.

Providing detachable lifting devices 80 may help to avoid misuse of the lifting devices 80 and/or possible damage of the turbocharger 10. For example, permanently-attached lifting devices may become damaged and/or may obstruct access near or within the engine after the turbocharger is mounted. Also, permanently-attached lifting devices may be used in ways that are not intended for the lifting devices, which may lead to damage of the lifting devices and/or the turbocharger.

Each mounting hole 60 may be configured to receive only one of the fastener 90 for mounting the turbocharger 10 or the shank 82 of the lifting device 80 at a time. Thus, the mounting holes 60 are dual-use and may be used for mounting the turbocharger 10 and for lifting the turbocharger 10. In order to mount the turbocharger 10 by inserting the fasteners 90 into the mounting holes 60, the lifting devices 80 are detached from the mounting holes 60, which may ensure that the lifting devices 80 are not misused or damaged and/or obstruct access near or within the engine when the turbocharger 10 is mounted.

There is no need for separate mounting holes for attaching the lifting devices 80, in addition to mounting holes for inserting the fasteners 90 for mounting the turbocharger 10 to the machine. The counterbores 66 of the mounting holes 60 may be standardized to receive the shanks 82 of the lifting devices 80, which may ensure a relatively safe and secure connection between the lifting devices 80 and the turbocharger 10. Also, the placement of the mounting holes 60 may allow the lifting devices 80 to be attached and detached with relative ease.

The counterbores 66 may be threaded to receive the shanks 82 of the lifting devices 80 and may be visible to personnel that lift and move the turbocharger 10. This may help to ensure that the personnel use the counterbores 66 of the mounting holes 60 to engage the shanks 82 of the lifting devices 80, rather than using other threaded bores on the turbocharger 10 that may not be dimensioned to receive the shanks 82. For example, the bearing housing 42 may include an oil inlet port that includes threads on the inner surface of the port to engage with a threaded cap to close the oil inlet port. Providing the counterbores 66 in the mounting holes 60 to receive the shanks 82 of the lifting devices 80 may prevent personnel from forcing the shanks 82 into the threads in the oil inlet port, which may damage the threads in the oil inlet port and/or allow oil to spill out of the bearing housing 42.

It will be apparent to those skilled in the art that various modifications and variations can be made to the disclosed turbocharger housing and method of mounting the turbocharger. Other embodiments will be apparent to those skilled in the art from consideration of the specification and practice of the disclosed turbocharger housing and method of mounting the turbocharger. It is intended that the specification and examples be considered as exemplary only, with a true scope being indicated by the following claims and their equivalents.

What is claimed is:

1. A housing for a turbocharger, the turbocharger housing comprising:
   a first outer surface;
   a second outer surface opposite the first outer surface;
   a mounting hole extending between the first outer surface and the second outer surface, the mounting hole including:
      a first end opposite a second end,
      a counterbore formed at the first end, the counterbore including threads that are configured to engage with threads on a shank of a lifting device, and
      a throughbore extending from the counterbore to the second end and configured to receive a fastener for mounting the turbocharger housing;
   wherein the counterbore forms a first opening through the first outer surface of the turbocharger housing and the throughbore forms a second opening through the second outer surface of the turbocharger housing,
   wherein the mounting hole is configured to receive only one fastener or shank at a time.

2. The turbocharger housing of claim 1, wherein the threads of the counterbore have a minor diameter that is larger than a diameter of the throughbore.

3. The turbocharger housing of claim 1, wherein the counterbore extends to about 30 mm or less from the first outer surface.

4. The turbocharger housing of claim 1, wherein the counterbore extends to between about 20 mm and about 30 mm from the first outer surface.

5. The turbocharger housing of claim 1, wherein:
   the turbocharger housing includes a bearing housing including bearings for supporting a shaft connecting a compressor wheel and a turbine wheel of the turbocharger; and
   the bearing housing includes the first outer surface, the second outer surface, and the mounting hole.

6. The turbocharger housing of claim 5, wherein:
   the bearing housing includes a first end, a second end opposite the first end of the bearing housing, and a channel extending through the first end of the bearing housing and the second end of the bearing housing; and
   the channel is configured to receive the shaft, the mounting hole having an axis that is generally perpendicular to an axis of the channel.

7. The turbocharger housing of claim 5, wherein:
   the turbocharger housing further includes a compressor housing configured to receive the compressor wheel and a turbine housing configured to receive the turbine wheel; and
   the bearing housing includes a first flange fastened to the compressor housing and a second flange fastened to the turbine housing.

8. The turbocharger housing of claim 1, wherein the mounting hole is one of a plurality of mounting holes in the bearing housing.

9. The turbocharger housing of claim 8, wherein the plurality of mounting holes have axes that are generally parallel.

10. The turbocharger housing of claim 1, wherein the first outer surface and the second outer surface are generally perpendicular to an axis of the mounting hole.

11. The turbocharger housing of claim 1, wherein the lifting device includes a lifting eye.

12. A turbocharger comprising:
   a compressor housing including a compressor wheel;
   a turbine housing including a turbine wheel;
   a shaft attached at a first end to the compressor wheel and attached at a second end to the turbine wheel; and
   a bearing housing connecting the compressor housing to the turbine housing, the bearing housing including bearings for supporting the shaft, the bearing housing including:
      a first outer surface,
      a second outer surface opposite the first outer surface, and a mounting hole extending between the first outer surface and the second outer surface, the mounting hole including;
a first end opposite a second end,
a counterbore formed at the first end of the mounting hole, the counterbore including threads that are configured to engage with threads on a shank of a lifting device,
a throughbore extending from the counterbore to the second end of the mounting hole and configured to receive a fastener for mounting the bearing housing;
wherein the counterbore forms, a first opening through the first outer surface of the bearing housing and the throughbore forms a second opening through the second outer surface of the bearing housing; and
wherein the mounting hole is configured to receive only one fastener or shank at a time.

13. The turbocharger of claim 12, wherein the mounting hole is one of a plurality of mounting holes in the bearing housing.

14. The turbocharger of claim 13, wherein each of the mounting holes has an axis that is generally perpendicular to an axis of the shaft.

15. The turbocharger of claim 13, wherein the plurality of mounting holes are disposed around the shaft such that at least a first pair of the mounting holes is disposed on one side of the shaft and at least a second pair of the mounting holes is disposed on an opposite side of the shaft.

16. The turbocharger of claim 12, wherein the hearing housing includes a first flange on a first end and a second flange on a second end opposite the first end of the bearing housing, the first flange being configured to connect to the compressor housing, the second flange being configured to connect to the turbine housing, the bearing housing including a channel configured to receive the shaft.

17. A method of mounting a turbocharger to a machine, the method comprising:
detaching a lifting device from a housing of the turbocharger by removing a shank of the lifting device from a counterbore in a mounting hole in the turbocharger housing, wherein the mounting hole extends between a first outer surface and a second outer surface of the turbocharger housing, and the second outer surface is opposite the first outer surface; and
after removing the shank, inserting a fastener through a throughbore in the mounting hole and attaching the fastener to the machine,
wherein the mounting hole has a first end and a second end, the counterbore is formed at the first end and forms a first opening through the first outer surface of the turbocharger housing, the throughbore is formed at the second end and forms a second opening through the second outer surface of the turbocharger housing.

18. The method of claim 17, wherein:
removing the shank of the lifting device from the counterbore in the turbocharger housing includes disengaging threads on the shank from threads on the counterbore.

19. The method of claim 17, further including using the lifting device to lift the turbocharger before removing the shank of the lifting device from the counterbore in the turbocharger housing.

20. The method of claim 17, wherein the mounting hole is one of a plurality of mounting holes in the turbocharger housing, the lifting device is one of a plurality of lifting devices that are detached from the turbocharger housing, and the fastener is one of a plurality of fasteners that are inserted through the respective plurality of mounting holes.

* * * * *